(12) United States Patent
Kuyel

(10) Patent No.: US 11,449,427 B2
(45) Date of Patent: Sep. 20, 2022

(54) MICROPROCESSOR-BASED SYSTEM MEMORY MANAGER HARDWARE ACCELERATOR

(71) Applicant: SK hynix Inc., Gyeonggi-do (KR)

(72) Inventor: Andrey Kuyel, Minsk (BY)

(73) Assignee: SK hynix Inc., Gyeonggi-do (KR)

( * ) Notice: Subject to any disclaimer, the term of this patent is extended or adjusted under 35 U.S.C. 154(b) by 399 days.

(21) Appl. No.: 16/790,024

(22) Filed: Feb. 13, 2020

(65) Prior Publication Data

US 2021/0255956 A1 Aug. 19, 2021

(51) Int. Cl.
*G06F 11/00* (2006.01)
*G06F 12/0855* (2016.01)
(Continued)

(52) U.S. Cl.
CPC ........ *G06F 12/0855* (2013.01); *G06F 9/3802* (2013.01); *G06F 11/073* (2013.01); *G06F 11/0727* (2013.01); *G06F 11/0751* (2013.01); *G06F 11/0793* (2013.01); *G06F 12/0862* (2013.01); *G06F 12/10* (2013.01);
(Continued)

(58) Field of Classification Search
CPC ............... G06F 11/0727; G06F 11/073; G06F 11/0751; G06F 11/0793; G06F 12/0855; G06F 12/10; G06F 12/1009; G06F 12/0246; G06F 12/0862; G06F 12/023; G06F 12/0238; G06F 13/28; G06F 9/3802; G06F 9/3804; G06F 9/3806; G06F 9/3836; G06F 9/3842; G06F 9/3844; G06F 9/3846; G06F 9/3848; G06F 2212/1024; G06F 2212/608; G06F 2212/6028; G06F 2212/7203; Y02D 10/00
See application file for complete search history.

(56) References Cited

U.S. PATENT DOCUMENTS 5,305,389 A * 4/1994 Palmer ................ G06F 12/0862
707/999.102
5,454,117 A * 9/1995 Puziol .................. G06F 9/3806
712/240
(Continued)

OTHER PUBLICATIONS

T. Chen and G. E. Suh, "Efficient data supply for hardware accelerators with prefetching and access/execute decoupling," 2016 49th Annual IEEE/ACM International Symposium on Microarchitecture (MICRO), 2016, pp. 1-12, doi: 10.1109/MICRO.2016.7783749. (Year: 2016).*

(Continued)

*Primary Examiner* — Anthony J Amoroso
(74) *Attorney, Agent, or Firm* — IP & T Group LLP

(57) ABSTRACT

Systems and methods reduce processor access time to different system memories. One such system comprises a tightly-coupled memory (TCM) that stores a first of N parts of a firmware binary image; multiple memory regions, which store a second to Nth part of the firmware binary image respectively, each of the memory regions being coupled to a bus; a processor coupled to the TCM and that executes the parts of the firmware binary image; and a memory manager hardware accelerator coupled between the processor and the bus, and that predicts which part of the firmware image is to be executed next, while the processor executes a different part of the firmware image.

11 Claims, 8 Drawing Sheets

(51) Int. Cl.
    *G06F 11/07*     (2006.01)
    *G06F 12/10*     (2016.01)
    *G06F 13/28*     (2006.01)
    *G06F 9/38*     (2018.01)
    *G06F 12/0862*     (2016.01)

(52) U.S. Cl.
    CPC ...... *G06F 13/28* (2013.01); *G06F 2212/1024* (2013.01); *G06F 2212/608* (2013.01); *G06F 2212/6028* (2013.01)

(56) References Cited

U.S. PATENT DOCUMENTS

| | | | | |
|---|---|---|---|---|
| 6,084,733 | A * | 7/2000 | Ohzeki | G11B 20/1816 |
| 8,473,718 | B2 | 6/2013 | Patel | |
| 10,521,236 | B2 * | 12/2019 | Wilkerson | G06F 9/30058 |
| 10,565,131 | B2 * | 2/2020 | Chung | G06F 12/1009 |
| 10,664,273 | B2 * | 5/2020 | Hughes | G06F 9/30036 |
| 10,817,441 | B2 * | 10/2020 | Kumar | G06F 3/0647 |
| 10,990,481 | B2 * | 4/2021 | Borlick | G06F 11/14 |
| 11,086,712 | B2 * | 8/2021 | Alavi | G06F 11/0727 |
| 2012/0019549 | A1 * | 1/2012 | Patel | G06F 9/30134 345/503 |
| 2017/0004101 | A1 | 1/2017 | Shao | |
| 2020/0042247 | A1 * | 2/2020 | Ryu | G06F 3/0673 |

OTHER PUBLICATIONS

R. Ammendola et al., "Virtual-to-Physical address translation for an FPGA-based interconnect with host and GPU remote DMA capabilities," 2013 International Conference on Field-Programmable Technology (FPT), 2013, pp. 58-65, doi: 10.1109/FPT.2013.6718331. (Year: 2013).*

S. Cheng, M. Lin, H. J. Liu, S. Scott and J. Wawrzynek, "Exploiting Memory-Level Parallelism in Reconfigurable Accelerators," 2012 IEEE 20th International Symposium on Field-Programmable Custom Computing Machines, 2012, pp. 157-160, doi: 10.1109/FCCM.2012.35. (Year: 2012).*

J. Leng, A. Buyuktosunoglu, R. Bertran, P. Bose and V. J. Reddi, "Asymmetric Resilience for Accelerator-Rich Systems," in IEEE Computer Architecture Letters, vol. 18, No. 1, pp. 83-86, Jan. 1-Jun. 2019, doi: 10.1109/LCA.2019.2917898. (Year: 2019).*

J. Leng et al., "Asymmetric Resilience: Exploiting Task-Level Idempotency for Transient Error Recovery in Accelerator-Based Systems," 2020 IEEE International Symposium on High Performance Computer Architecture (HPCA), 2020, pp. 44-57, doi: 10.1109/HPCA47549.2020.00014. (Year: 2020).*

* cited by examiner

MICROPROCESSOR-BASED SYSTEM MEMORY MANAGER HARDWARE ACCELERATOR

BACKGROUND

1. Field

Embodiments of the present disclosure relate to a memory manager hardware accelerator, and method of operating a system incorporating a memory manager hardware accelerator.

2. Description of the Related Art

The computer environment paradigm has shifted to ubiquitous computing systems that can be used virtually anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Data storage devices using memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

SSDs and many other types of components employ embedded systems, in which more and more system functionality is handled by the microprocessor of the system. The latest generation of embedded microprocessors has enough processing power to coordinate the components of an embedded system and to transform and process data using complex and resource-intensive algorithms. In some cases, the hardware logic of the embedded system is replaced by the corresponding algorithms that are running on embedded microprocessors. Rich features and complex algorithm firmware generally requires large memory capacity to fit binary executable code.

Latency, i.e., access time, of the central processing unit (CPU) to non-tightly coupled memory remains an issue. In this context, embodiments of the present invention arise.

SUMMARY

An aspect of the present invention is directed to a memory manager hardware accelerator that comprises a controller and command processor (CCP) module to control data flow and to determine which internal commands are to be executed; a processor instructions analyzer, operably coupled to a processor and to the CCP module, to search for process specific branch instructions, among instructions committed to the processor and among binary executable code preloaded to a cache of the accelerator, and to generate a transaction to notify the CCP module when the specific branch instructions is detected; a cache manager to hold data and notify the CCP module as to whether data required by the CCP module is present in the cache manager; and a direct memory access (DMA) engine to transfer data from a target address to the cache manager under the control of the CCP module.

Another aspect of the present invention is directed to a memory system that comprises a tightly-coupled memory (TCM) to store a first of N parts of a firmware binary image; multiple memory regions to store a second to Nth part of the firmware binary image respectively, each of the memory regions being operably coupled to a bus; a processor, operably coupled to the TCM (and other memories), to execute the parts of the firmware binary image; and a memory manager hardware accelerator, operably coupled between the processor and the bus, to predict which part of the firmware image is to be executed next, while the processor executes a different part of the firmware image. The binary code predicted for future execution is preloaded by the accelerator to its internal cache.

Still another aspect of the present invention entails a method of operating a memory manager hardware accelerator in a memory system. The method comprises detecting a data error in the memory system; initiating a first error recovery process; preloading a second error recovery process including associated initial code in the memory manager hardware accelerator, while performing the first error recovery process; executing the initial code for the second error recovery process when the first error recovery process fails; loading next part of the code for the second error recovery process during execution of the initial code in the second error recovery process; and executing next part of the code for the second error recovery process.

Additional aspects of the present invention will become apparent from the following description.

DETAILED DESCRIPTION

Figure 1:
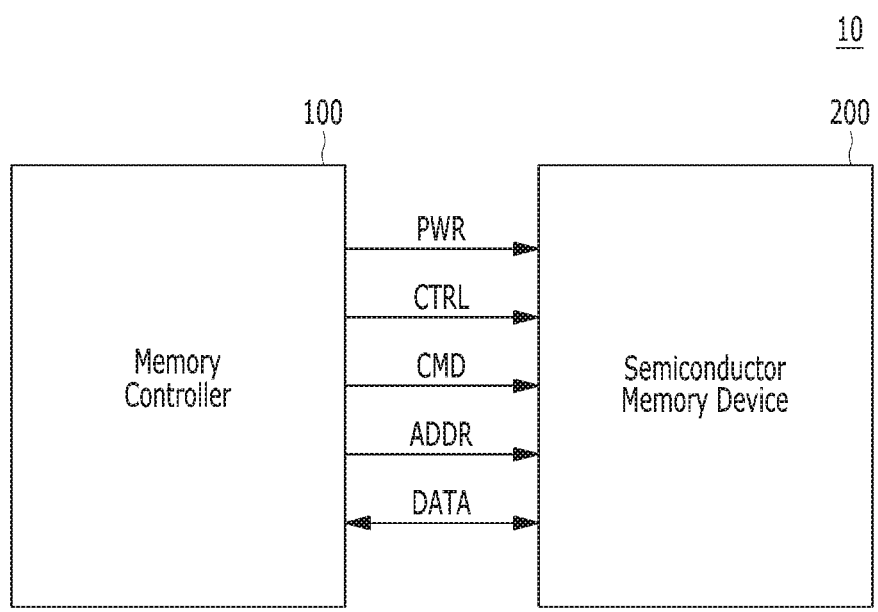
FIG. 1 is a block diagram illustrating a memory system in accordance with an embodiment of the present invention.

Various embodiments are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Moreover, reference herein to "an embodiment," "another embodiment," or the like is not necessarily to only one embodiment, and different references to any such phrase are not necessarily to the same embodiment(s). Throughout the disclosure, like reference numerals refer to like parts in the figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The scope of the invention is limited only by the claims. The invention encompasses numerous alternatives, modifications and equivalents within the scope of the claims. Numerous specific details are set forth in the following description in order to provide a thorough understanding of the invention. These details are provided for the purpose of example; the invention may be practiced according to the claims without some or all of these specific details. For clarity, technical material that is known in technical fields related to the invention has not been described in detail so that the invention is not unnecessarily obscured.

FIG. 1 is a block diagram schematically illustrating a memory system in accordance with an embodiment of the present invention.

Referring to FIG. 1, the memory system 10 may include a memory controller 100 and a semiconductor memory device 200, which may represent more than one such device. The semiconductor memory device(s) 200 may be flash memory device(s), particularly of the NAND-type. For brevity, memory controller 100 and semiconductor memory device 200 are sometimes simply referred to below as controller 100 and memory device 200, respectively.

The controller 100 may control overall operations of the memory device 200.

The memory device 200 may perform one or more erase, program, and read operations under the control of the memory controller 100. The memory device 200 may receive a command CMD, an address ADDR and data DATA through input/output (I/O) lines. The memory device 200 may receive power PWR through a power line and a control signal CTRL through a control line. The control signal CTRL may include a command latch enable (CLE) signal, an address latch enable (ALE) signal, a chip enable (CE) signal, a write enable (WE) signal, a read enable (RE) signal, and the like.

The memory controller 100 and the semiconductor memory device 200 may be integrated in a single semiconductor device such as a solid state drive (SSD). The SSD may include a storage device for storing data therein. When the memory system 10 is used in an SSD, operation speed of a host (not shown) coupled to the memory system 10 may remarkably improve.

In another embodiment, the memory controller 100 and the semiconductor memory device 200 may be integrated in a single semiconductor device such as a memory card. For example, the memory controller 100 and the semiconductor memory device 200 may be so integrated to configure a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC) card, and/or a universal flash storage (UFS).

In still another embodiment, the memory system 10 may be provided as one of various components in an electronic device, such as a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

Figure 2:
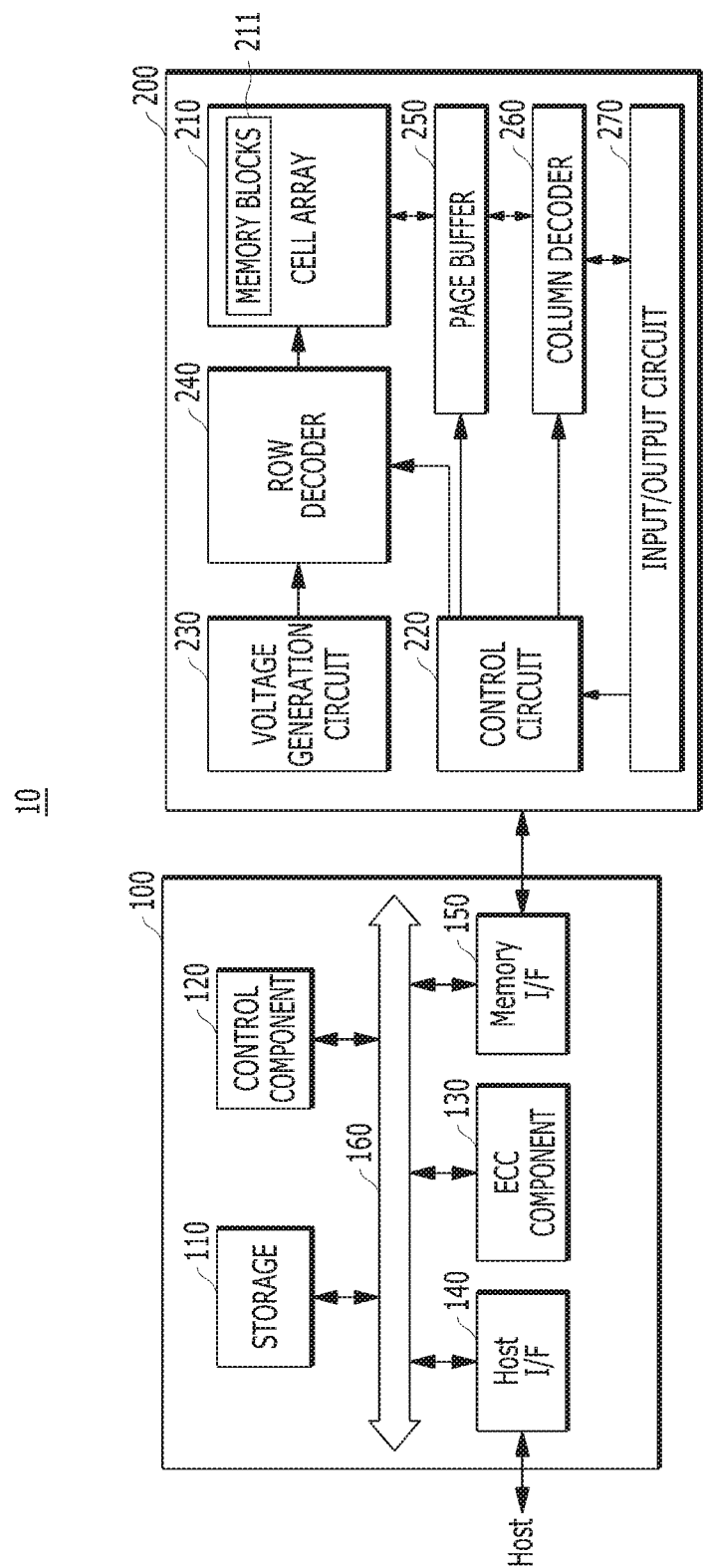
FIG. 2 is a block diagram illustrating a memory system in accordance with an embodiment of the present invention.

FIG. 2 is a detailed block diagram illustrating a memory system in accordance with an embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device, and in particular, store data to be accessed by the host device.

The host device may be implemented with any one of various kinds of electronic devices. In some embodiments, the host device may include an electronic device, such as a desktop computer, a workstation, a three-dimensional (3D) television, a smart television, a digital audio recorder, a digital audio player, a digital picture recorder, a digital picture player, and/or a digital video recorder and a digital video player. In some embodiments, the host device may include a portable electronic device, such as a mobile phone, a smart phone, an e-book, an MP3 player, a portable multimedia player (PMP), and/or a portable game player.

The memory device 200 may store data to be accessed by the host device.

The memory device 200 may be implemented with a volatile memory device, such as a dynamic random access memory (DRAM) and/or a static random access memory (SRAM) or a non-volatile memory device, such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110 and a control component 120, which may be implemented as a processor, e.g., a central processing unit (CPU). The controller 100 may further include an error correction code (KC) component 130, a host interface (I/F) 140 and a memory interface (I/F) 150. All components of the controller 100 may be coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with, or include, a volatile memory such as a static random access memory (SRAM) and/or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and a write operation or a read operation for the memory device 200, in response to a write request or a read request from the host device. The control component 120 may drive firmware (FW), which is referred to as a flash translation layer (FTL), to control general operations of the memory system 10. For example, the FTL may perform operations, such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure to correct the error bits.

The ECC component 130 may perform an error correction operation based on a coded modulation, such as a low-density parity-check (LDPC) code including both regular and irregular LDPC codes, a Bose-Chaudhuri-Hocquenghem code, a turbo code, a turbo product code, a Reed-Solomon code, a convolution code, a recursive systematic code, a trellis-coded modulation, or a block coded modulation (BCM).

Thus, the ECC component 130 may include any and all circuits, systems or devices for suitable error correction operation, including detecting and correcting errors in codes in accordance with embodiments of the present invention. For example, the ECC component 130 may include one or more encoders and one or more decoders.

The host interface 140 may communicate with the host device through one or snore of various interface protocols, such as a universal serial bus (USB), a multi-media card (MMC), a peripheral component interconnect express (PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control component or CPU 120. When the memory device 200 is a flash memory such as a NAND flash memory, the memory interface 150 may generate control signals for the memory and process data under the control of the CPU 120.

The memory device 200 may include a memory cell array 210, a control circuit 220, a voltage generation circuit 230, a row decoder 240, a page buffer 250, which may be in the form of an array of page buffers, a column decoder 260, and an input/output circuit 270. The memory cell array 210 may include a plurality of memory blocks 211 which may store data. The voltage generation circuit 230, the row decoder 240, the page buffer (array) 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address RADD generated by the control circuit 220, and transmit operation voltages supplied from the voltage generation circuit 230 to the selected memory blocks.

Figure 3:
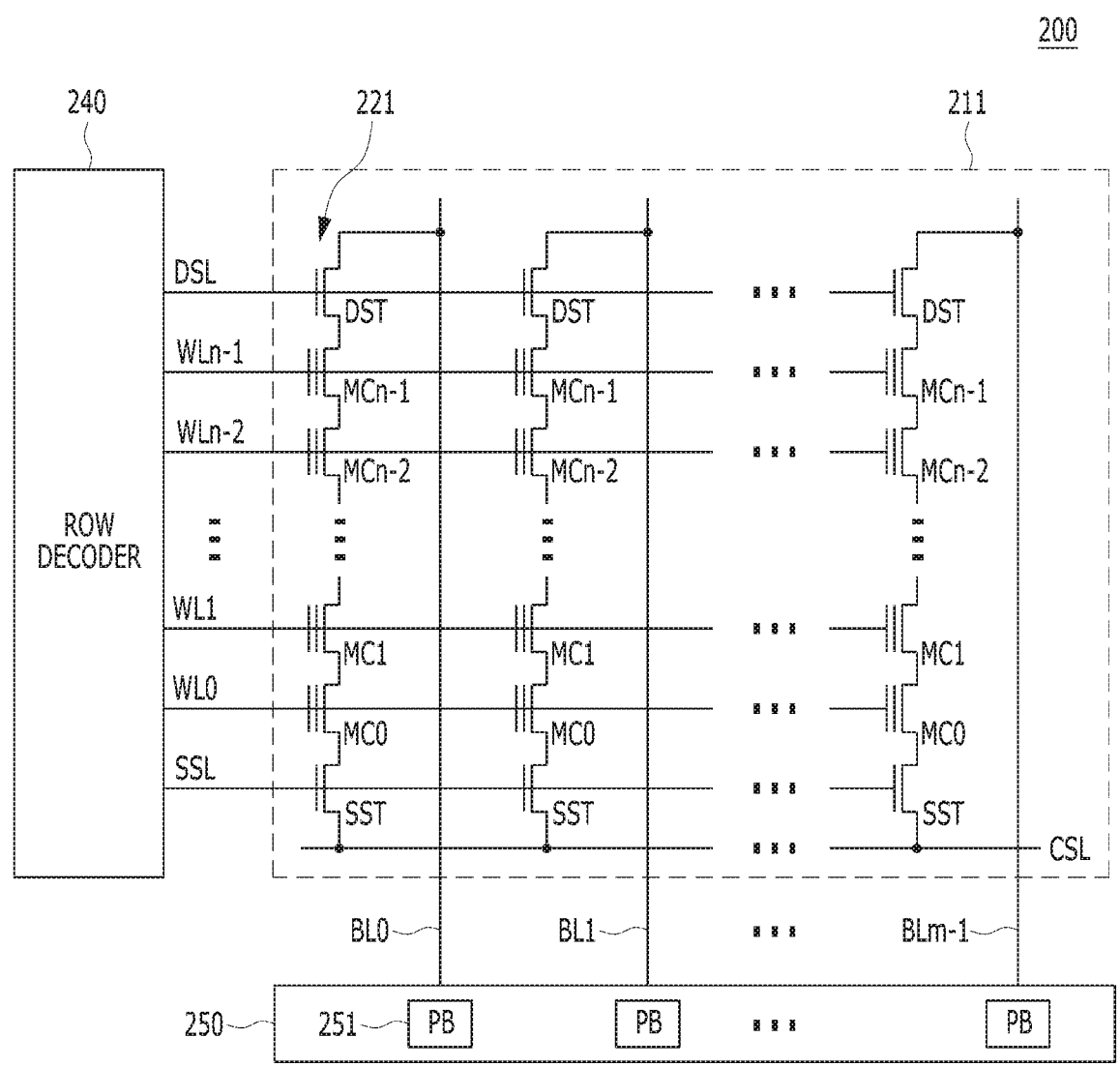
FIG. 3 is a circuit diagram illustrating a memory block of a memory device of a memory system in accordance with an embodiment of the present invention.

The page buffer (array) 250 may be in electrical communication with the memory cell array 210 through bit lines BL (shown in FIG. 3). The page buffer (array) 250 may pre-charge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer (array) 250, and may also exchange data with the input/output circuit 270.

The input/output circuit 270 may transmit to the control circuit 220 a command and an address, received from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

Aspects of the present invention may be embodied in memory systems such as memory system 10. Memory systems with other configurations may also be used, as described below in connection with FIGS. 4-7.

FIG. 3 is a circuit diagram illustrating a memory block of a semiconductor memory device in accordance with an embodiment of the present invention. For example, the memory block of FIG. 3 may be any of the memory blocks 211 of the memory cell array 210 shown in FIG. 2.

Referring to FIG. 3, the exemplary memory block 211 may include a plurality of word lines WL0 to WLn-1, a drain select line DSL and a source select line SSL coupled to the row decoder 240. These lines may be arranged in parallel with the plurality of word lines between the DSL and SSL.

The exemplary memory block 211 may further include a plurality of cell strings 221 respectively coupled to bit lines BL0 to BLm-1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn-1 may be serially coupled between the selection transistors DST and SST. Each of the memory cells may be formed as a multi-level cell (MLC) storing data information of multiple bits.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

As previously noted, the page buffer 250 may be in the form of a page buffer array including a plurality of page buffers 251 that are coupled to the bit lines BL0 to BLm-1. The page buffers 251 may operate in response to page buffer control signals. For example, the page buffers 251 my temporarily store data received through the bit lines BL0 to BLm-1 or sense voltages or currents of the bit lines during a read or verify operation.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

As previously noted, in modern embedded systems, more and more system functionality is handled by the microprocessor. The latest generation of embedded microprocessors have enough processing power to coordinate operations of other components of an embedded system, and to transform and process data using complex and resource-intensive algorithms. In some cases, the hardware logic of the embedded system is replaced by corresponding algorithms that are executed by embedded microprocessors. Rich features and complex firmware algorithms, however, generally require large memory capacity to store binary executable code. To minimize CPU latency access to an executable binary code, firmware binary code may be linked to Tightly-Coupled Memory (TCM). The main benefit of TCM is that the CPU can access it without any delays related to bus topology and bus load. However, because of embedded system design constraints, it is not always possible to increase TCM size to fit the entire firmware image to TCM. In such cases, the available embedded system memory or external memory may be used to fit the firmware image.

The available memory of an embedded system which can be reused to fit firmware binary code may vary depending on the system configuration. To reuse system memory, depending on the system configuration, linked and precompiled copies of binary code are stored in advance. The number of stored, precompiled firmware binary images, in turn, is limited by the amount of memory available for storing these snapshots and the possible number of system configurations. In addition, dynamic relocation of a portion of the binary firmware code from one address space to another is not possible without reloading the entire firmware, since the firmware snapshot that is loaded during boot-up contains linked addresses inside the binary code. Firmware executable binary code operates with fixed address space defined during a linkage stage. Therefore, a portion of the firmware binary code cannot be moved to another memory location without updating the addresses inside the executable binary code. A hardware accelerator, relying on a virtual to physical address translation table, allows a single firmware binary image to be dynamically relocated inside the system memory.

Distribution of firmware binary images across different memories may result in unequal CPU access time to the executable code. That, in turn, may have an impact on overall embedded system performance. The CPU access time varies depending on the underlying memory type, the location of the memory in the system, and the bus load during access.

According to embodiments of the present invention, a hardware accelerator is configured to significantly reduce the CPU access time to executable binary code stored in different system memories by early preloading into the local cache of the hardware accelerator the code to be executed by the CPU. Such preloading may be triggered automatically by internal logic of the hardware accelerator or by corresponding hardware accelerator instructions embedded in the firmware source code.

According to embodiments of the present invention, a memory manager hardware accelerator may generally include the following components: internal memory for caching the preloaded data; dynamically reconfigurable logic that transforms a virtual address into a physical address; and logic that handles the commands supported by the accelerator. The commands trigger early data preloading from system memories and perform other necessary operations on the accelerator. Such commands may be embedded in the source code of the firmware manually by the developer or automatically by a dedicated software tool. The memory manager hardware accelerator supports an instruction set that may be embedded into firmware source code. Hardware accelerator instruction(s) forces the accelerator to perform the task mapped to the corresponding instruction.

Hardware accelerator commands may be automatically inserted into the source code of the firmware by a special software tool during firmware source code compilation. The hardware accelerator logic executes commands embedded into firmware source code and analyzes executable binary code prefetched by the CPU from non-tightly coupled memories and, based on analyses results in accordance with the predefined rules, preloads the necessary pieces of executable code into the accelerator cache to speed up CPU access to the required executable code.

Figure 4:
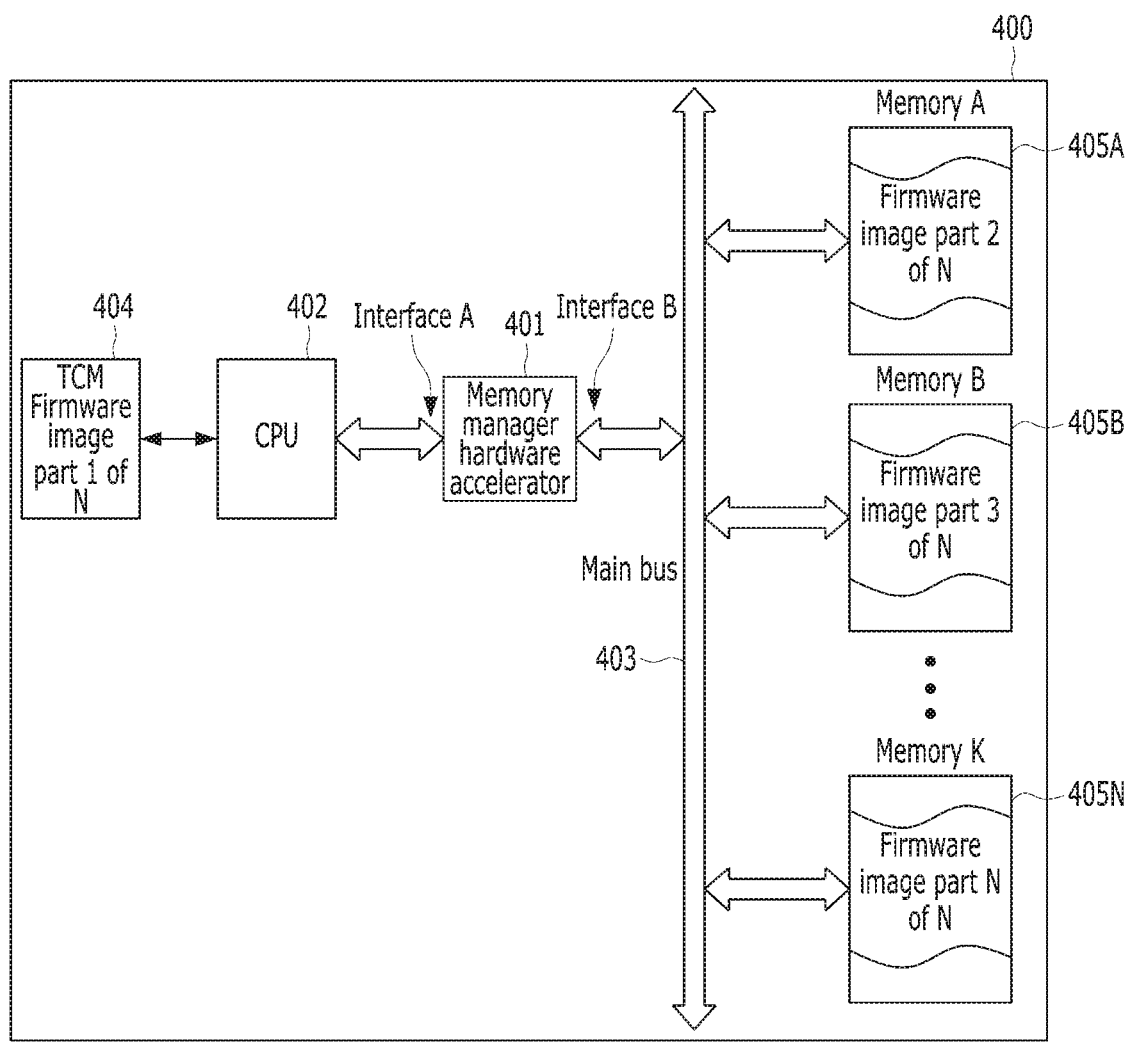
FIG. 4 is schematic diagram illustrating a memory manager hardware accelerator system in accordance with an embodiment of the present invention.

FIG. 4 is a schematic diagram illustrating a memory manager hardware accelerator 401, among other components, in a memory system 400 according to an embodiment of the present invention. In the memory system 400, the memory manager hardware accelerator 401 is operably connected between a CPU 402 and a main bus 403. The CPU 402 is operably coupled to a TCM component 404, which is configured to store a first part (part 1 of N parts) of a firmware image.

For brevity, sometimes memory manager hardware accelerator 401 is simply referred to as accelerator 401.

The connection through the main bus 402 provides the CPU 402 access to system peripherals, e.g., memory elements or regions 405A, 405B, . . . 405N, each of which is operably coupled to the main bus 403 as shown in FIG. 4. The firmware source code is compiled for a single virtual memory map view independently of the firmware binary image location. To this end, the memory regions 405A, 405B, . . . , 405N store parts 2 to N of the firmware image, respectively, while the TCM 404 stores part 1 of the firmware image.

The accelerator 401 converts virtual addresses to physical addresses according to the configuration. The configuration for virtual-to-physical address translation can be changed dynamically, which allows relocating parts of the executable code in the TCM 404 without replacing the entire firmware binary code with a firmware binary image compiled for the updated memory layout. The accelerator 401 analyzes the stream of data read over the data bus interface (Interface A in FIG. 4). The data passing through interface A includes the executable binary code of the CPU 402. The accelerator 401 searches for a branch of CPU instructions, among those directly committed to the CPU 402 through interface A.

A branch is an instruction in a computer program that can cause a computer to begin executing a different instruction sequence and thus deviate from its default behavior of executing instructions in order. Branch (or branching, branched) may also refer to the act of switching execution to a different instruction sequence as a result of executing a branch instruction. Branch instructions are used to implement control flow in program loops and conditionals (i.e., executing a particular sequence of instructions only if certain conditions are satisfied).

A branch instruction can be either an unconditional branch, which always results in branching, or a conditional branch, which may or may not cause branching depending on some condition. Also, depending on how it specifies the address of the new instruction sequence (the "target" address), a branch instruction is generally classified as direct, indirect or relative, meaning that the instruction contains the target address, or it specifies where the target address is to be found (e.g., a register or memory location), or it specifies the difference between the current and target addresses.

By way of example, ARM R8 branch instructions listed in Table 1 may be searched by the accelerator 401.

TABLE 1

ARM R8 branch and control instructions

| Mnemonic | Brief description | See |
|---|---|---|
| B | Branch | B, BL, BX, and BLX |
| BL | Branch with Link | B, BL, BX, and BLX |
| BLX | Branch indirect with Link | B, BL, BX, and BLX |
| BX | Branch indirect | B, BL, BX, and BLX |
| CBNZ | Compare and Branch if Non Zero | CBZ and CBNZ |
| CBZ | Compare and Branch if Zero | CBZ and CBNZ |
| IT | If-Then | IT |
| TBB | Table Branch Byte | TBB and TBH |
| TBH | Table Branch Halfword | TBB and TBH |

When the specific processor instructions targeted in the search is detected, the accelerator 401 may trigger (request) execution of internal hardware accelerator commands.

For example, one of the commands may direct that the next part of the executable code be preliminarily preloaded into a cache of the accelerator 401. This executable binary code preloaded to the accelerator cache may be executed by the CPU 402 when certain conditions in the executed code are met. By way of example, the accelerator 401, after detection of "BEQ 0x4500_2300" instruction in the preloaded CPU binary code, will transfer to internal cache 256 Bytes from address 0x4500_2300. An executable code is stored at memory address 0x4500_2300; this code will be executed if the branch condition satisfied. The transfer size of 256 Bytes is an accelerator configuration parameter of the accelerator 401 that can be modified. In this case, the CPU 402 gets the required data from the accelerator cache without the need to access the original (physical) data location. In this way, the CPU 402 does not suspend instruction execution and waits until the data is fetched from remote memory. In other words, the accelerator 401 predicts which part of the executable code may be executed in the next step of program execution flow and preloads the corresponding part of executable code to the local cache, i.e., the cache of the accelerator 401. The accelerator 401 preloads the CPU instructions into its cache early, and thus reduces access time of the CPU 402 to the necessary executable code. The accelerator 401 supports embedding memory management commands in the firmware source code. These commands can be inserted into the source code of the firmware manually by the developer or automatically, through use of a software tool that analyzes the linked source code for the instructions' location in the physical address space. One such command may enforce accelerator cache replacement with the data loaded from the selected physical memory as described above. The processing of the memory management commands can be turned off dynamically. The preservation and renewal of the cached data in the memory of the accelerator 401 are carried out by the cache manager sub-module of the accelerator 401. The cache manager 604 replaces pieces of binary code in the accelerator cache in such a way as to reduce the number of accesses to the physical underlying memory.

Figure 5:
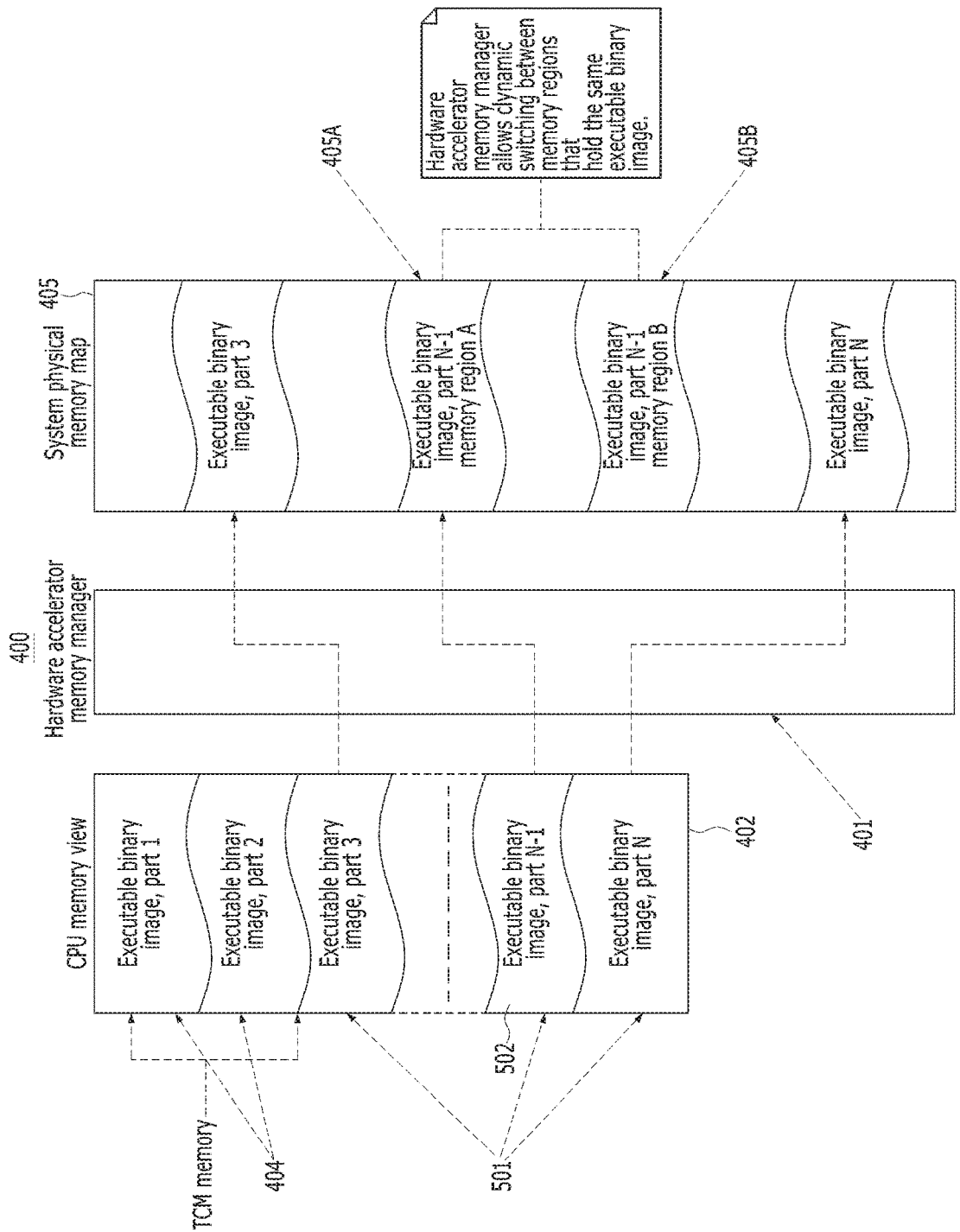
FIG. 5 is schematic diagram illustrating a central processing unit (CPU) virtual memory view in accordance with an embodiment of the present invention.

FIG. 5 shows the CPU memory view of firmware binary code virtual address mapping in accordance with an embodiment of the present invention.

From the perspective of the CPU 402, firmware executable binary code is located in contiguous virtual address space. A part of firmware is fit into the TCM 404 and the remainder of the firmware binary image is distributed across the system memory 405 that corresponds to virtual address space 501. The executed firmware is unaware of the actual binary code location and is compiled for a single virtual address map. The translation from virtual to physical address space is made by the memory manager hardware accelerator 401. As described previously, the virtual to physical address translation of the accelerator 401 can be reconfigured dynamically, providing the ability to change the physical location of the executable firmware binary code in runtime.

For example, the physical location of firmware binary image part N-1 405A (Memory A) can be dynamically switched to a new physical location 405B (Memory B).

By way of example, consider the mapping reconfiguration feature of the accelerator 401. Assume that memory region 405A is faster than memory region 405B, and that initially the memory region 405A is reserved for another module/task rather than for CPU instruction storage. Therefore, the memory region 405A can be used for the CPU executable code storage only when it is not in use by another module.

By way of example, assume that memory region 405A is used for debug information storage. However, when the system 400 operates in the non-debug mode (which is most of the time), region 405A is used for CPU instruction storage. Before the system 400 enters the debug mode, the firmware will switch the accelerator 401 to memory region 405B, and memory region 405A will be reused for debug information storage. In other words, an accelerator virtual to physical translation table is updated to map virtual address range 502 to physical address space 405A.

Table 2 below lists exemplary commands supported by the accelerator 401.

"Virtual End Address" is an end address of a virtual memory region. The size of the region is (virtual end address−virtual start address+1).

"Physical start address" is the start address of the physical memory region that is mapped to a respective virtual memory region start address.

"Executable region flag" indicates a bit that should be set to 'Yes' if this region contains CPU executable binary code; otherwise, the flag bit should be set to 'No'.

TABLE 2

| Command | Parameters | Description |
| --- | --- | --- |
| Preload data | Address - target address to preload data from. | This command preloads a certain amount of data from the target address and updates the system cache. |
| Preload data without cache update | Address - target address to preload data from. | This command preloads a certain amount of data from the target address without system cache update. |
| Invalidate cache by ID | Cache ID - id of the cache entry in cache table to invalidate. | Invalidates accelerator cache region. |
| Invalidate system cache | NA | Invalidates all accelerator cache. |
| Delete virtual to the physical mapping table entry | Entry UID - id of the entry to delete. | Deletes entry in virtual to the physical configuration table. |
| Update virtual to the physical mapping table entry | *Entry UID - id of the entry to update. If entry UID is zero then new table entry is created. *Virtual start address - start address of the virtual address space region. *Region size - region size Kbytes. *Physical start address - physical start address of the region. *Executable (Yes = 1, No = 0) - is region that contains executable binary code. | Updates or creates entry in virtual to the physical configuration table. This entry is used for virtual to physical address translation. |
| DMA transfer | *Source address - physical address of the source data *Destination address - destination physical address to copy data to. *Transfer size - number of bytes to copy from source address to destination address. | Copies N bytes of data from source address to destination address. |

Table 3 below shows the structure of the virtual to physical address translation table.

TABLE 3

| Table entry UID | Virtual Start Address | Virtual End Address | Physical Start Address | Executable region flag (Yes/No) |
| --- | --- | --- | --- | --- |
| a | address V.1 | address V.2 | address P.1 | Yes |
| b | address V.3 | address V.4 | address P.2 | No |

"Table entry UID" is a table entry unique identifier (UID). When a new virtual to physical mapping is added to the table, a table entry UID is assigned automatically in an incremental manner. UID can be used to reference a table entry to perform modification on the corresponding table entry (update entry or delete).

"Virtual Start Address" means the start address of the virtual memory region that is mapped to a respective physical memory region start address.

Figure 6:
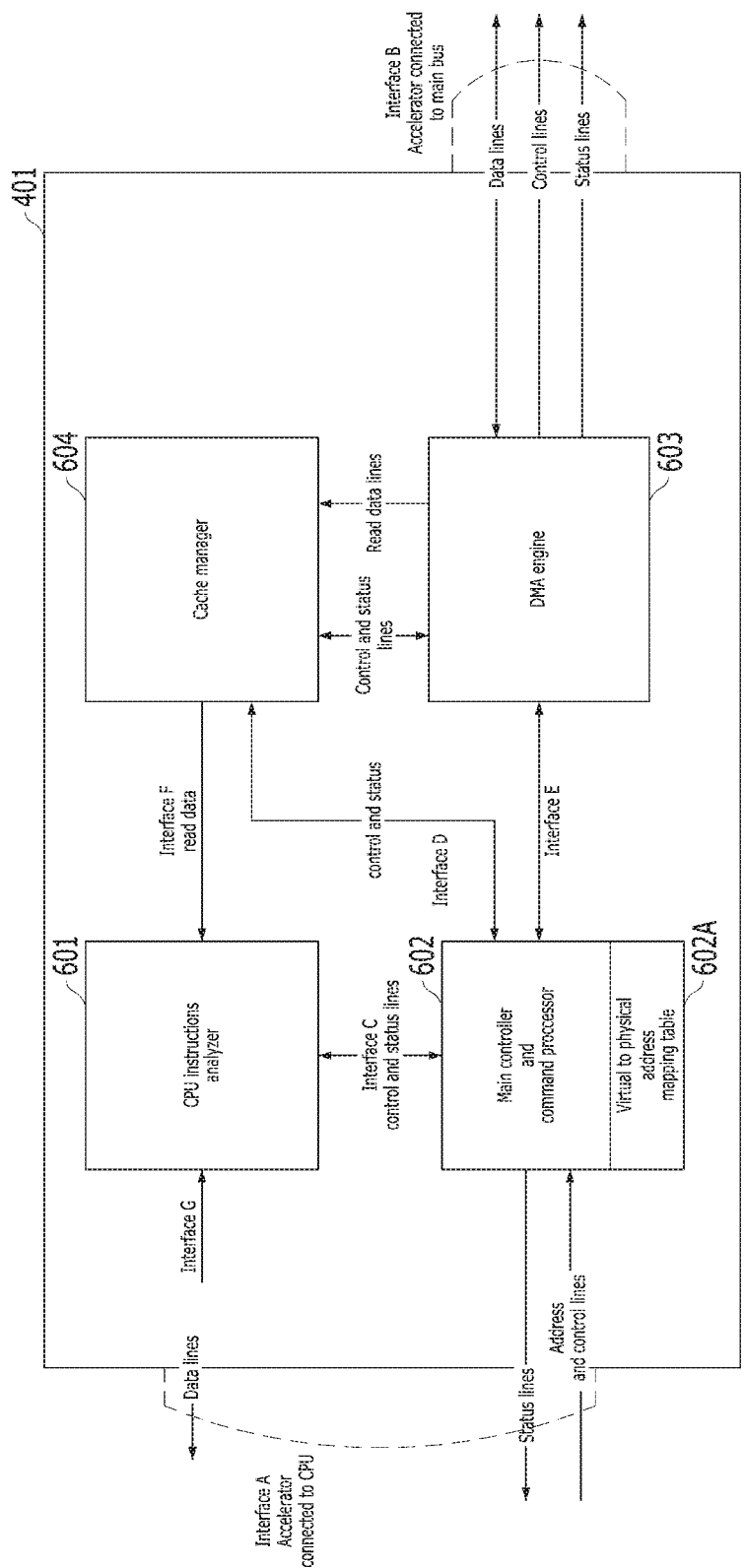
FIG. 6 is a block diagram illustrating a memory manager hardware accelerator in accordance with an embodiment of the present invention.

FIG. 6 is a block diagram of the memory manager hardware

FIG. 6 is a block diagram of the memory manager hardware accelerator 401 according to an embodiment of the present invention. Accelerator 401 may include a CPU instruction analyzer 601, a main control and command processor module 602, a direct memory access (DMA) engine 603, and a cache manager 604, which may function as the accelerator cache. The accelerator 401 communicates with the CPU 402 through interface A (see FIG. 4). Interface A may be implemented as an advanced extensible interface (AXI) bus that supports read and write transactions. The accelerator 401 is operably connected to the main bus 403 through interface B (see FIG. 4). Interface B may also be implemented as an AXI bus that supports read and write transactions.

The CPU instruction analyzer 601 searches for processor branch instructions, among those directly committed to the CPU 402, through interface A (i.e., read data interface signals) and among binary executable code fetched to the accelerator cache. Examples of branch instructions for the ARM R8 processor are listed in Table 1. When that branch instruction is detected, the CPU instructions analyzer 601 notifies the main controller and command processor 602 by generating a corresponding transaction. The CPU instruction analyzer 601 and the main controller and command processor 602 communicate through interface C, as shown in FIG. 6. The CPU instruction analyzer 601 supports detection of hardware accelerator specific commands that are explicitly used in the program source code and are requested for execution. Exemplary accelerator-supported commands are identified in Table 2 above.

The main controller and command processor 602 controls sub-modules and data flow in the accelerator 401. Controller/processor 602 decides which internal commands will be executed. See Table 2 for examples. Controller/processor 602 stores a virtual to physical address translation table 602A (see Table 3). According to the virtual to physical translation table, the main controller initiates data transfers by the DMA engine 603 to fetch the data for the cache manager 604. The DMA engine 603 transfers data from the physical source address to the cache manager 604. The instruction analyzer 601 determines the virtual address of the source data to be transferred to the cache manager 604 by DMA engine 603. The DMA engine 603 operates with physical addresses; therefore, before DMA transfer is initiated, the command processor 602 converts the virtual address to the corresponding physical address according to the virtual to physical address mapping table 602A, and initiates DMA transfer for the physical source address.

The cache manager 604 holds pre-fetched data (CPU executable binary code) and notifies the controller/processor 602 as to whether the required data is present in the cache manager 604. Based on the response from the cache manager 604, the controller/processor 602 determines whether to initiate data preloading by the DMA engine 603. The DMA engine 603 fetches the required data through interface B.

Firmware code can be distinguished based on frequency of use. That is, there may be one subset of the firmware code that is used at or above a particular frequency and another subset that is accessed below that frequency. This frequency may be set such that the subset of firmware code accessed below the frequency threshold is characterized as seldom used firmware code. As an example, seldom used firmware code may be that used for complex error recovery routines that are used only if all other error recovery methods fail. Another example, is firmware code used for software implementation of hardware modules operating at low frequencies (CPU capable of handling timing constraints of such software implemented module) or support for legacy hardware modules that are no longer implemented in SoC hardware.

Less frequently used firmware code may be placed in an external double data rate (DDR) memory. By way of example, complex error recovery algorithm code is placed in two locations (binary executable code duplicated in two locations): DDR and SRAM. The access to SRAM is faster than access to DDR, but SRAM is smaller and therefore is a high-demand system resource. Initially, the accelerator 401 is configured to redirect the invocation of complex error recovery function code to SRAM.

Figure 7:
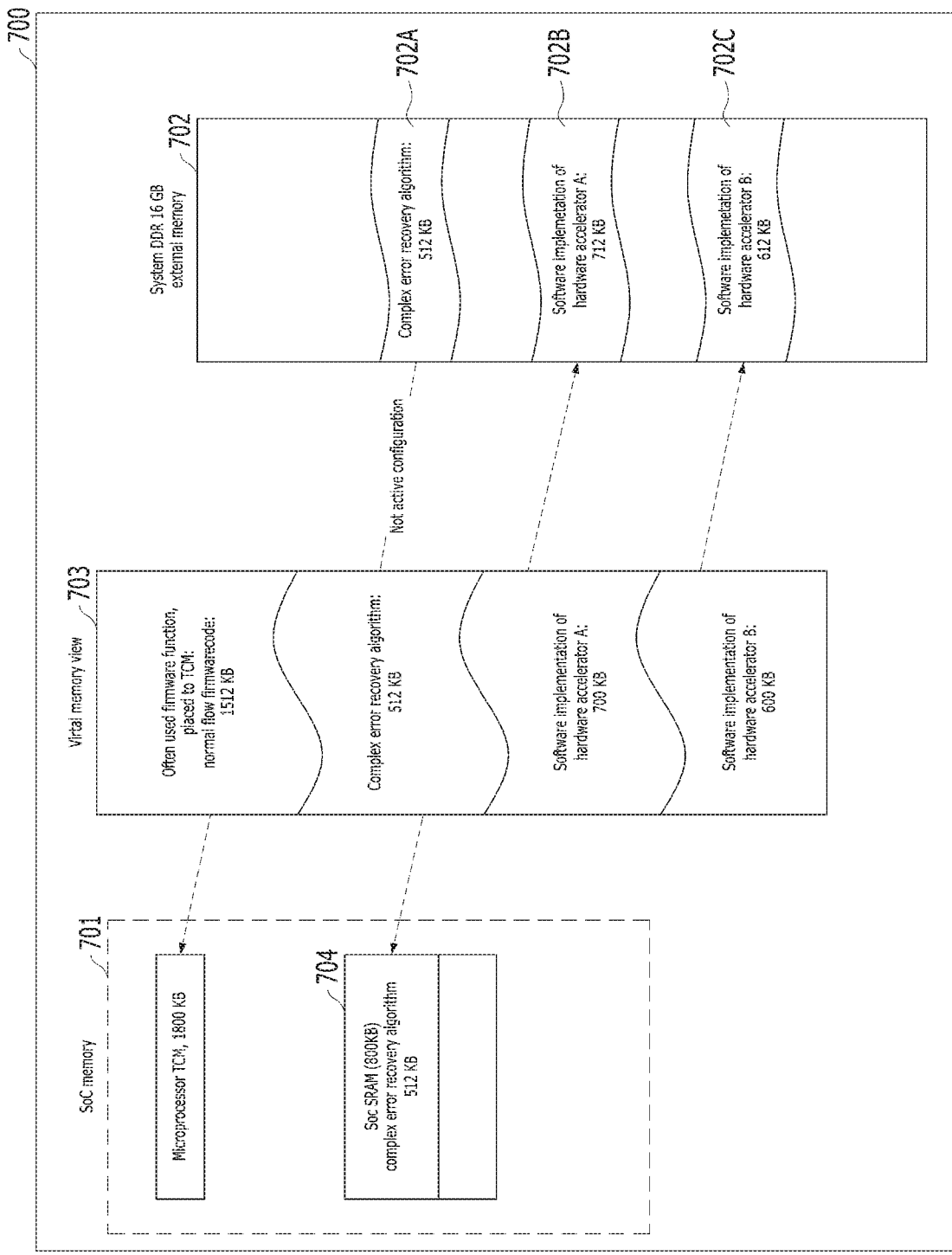
FIG. 7 is a schematic diagram illustrating CPU memory layout and corresponding physical layout with active static random access memory (SRAM) in accordance with an embodiment of the present invention.

FIG. 7 shows a virtual memory layout, the corresponding physical memory layout, and actual binary code location in a memory 701. The system 700 includes an SoC memory 701 and a system DDR external memory 702. A virtual memory view is denoted by reference numeral 703. The complex error recovery function code is located in both SRAM 704 of the SoC memory 701 and the system DDR external memory 702A. At memory location 702B, a software implementation of hardware accelerator A is stored. For example, software implemented hardware accelerator A is a software implementation of Universal Asynchronous Receiver/Transmitter (UART) that operates via SoC General Purpose Input/Output interfaces (GPIO). At memory location 702C, there is stored a software implementation of hardware accelerator B. For example, software implemented hardware accelerator B is a software implementation of Serial Flash (SF) controller that operates via SoC General Purpose Input/Output interfaces (GPIO). Initially, the memory manager hardware accelerator 401 is configured to redirect invocation for the complex error recovery routine to SRAM 704, but it is possible to reconfigure the memory manager hardware accelerator 401 at runtime to redirect invocation for the complex error recovery routine to DDR memory 702A.

When firmware invokes a complex error recovery routine, the accelerator 401 has already preloaded the corresponding part of the executable binary code into its internal cache. The pre-fetch of the error recovery binary code may be triggered by the command 'preload data' or the like (see exemplary list in Table 2), which command is issued by the accelerator 401 as result of code analyses by the CPU instruction analyzer 601 or which command was embedded into firmware source code. This command may be embedded into the firmware source code by a developer who is aware that, if the common error recovery procedure fails, a complex error recovery routine will be used for error recovery. During execution of the complex error recovery routine, the accelerator 401 pre-fetches and updates its internal cache to preserve only data that is to be used in the next execution steps.

Figure 8:
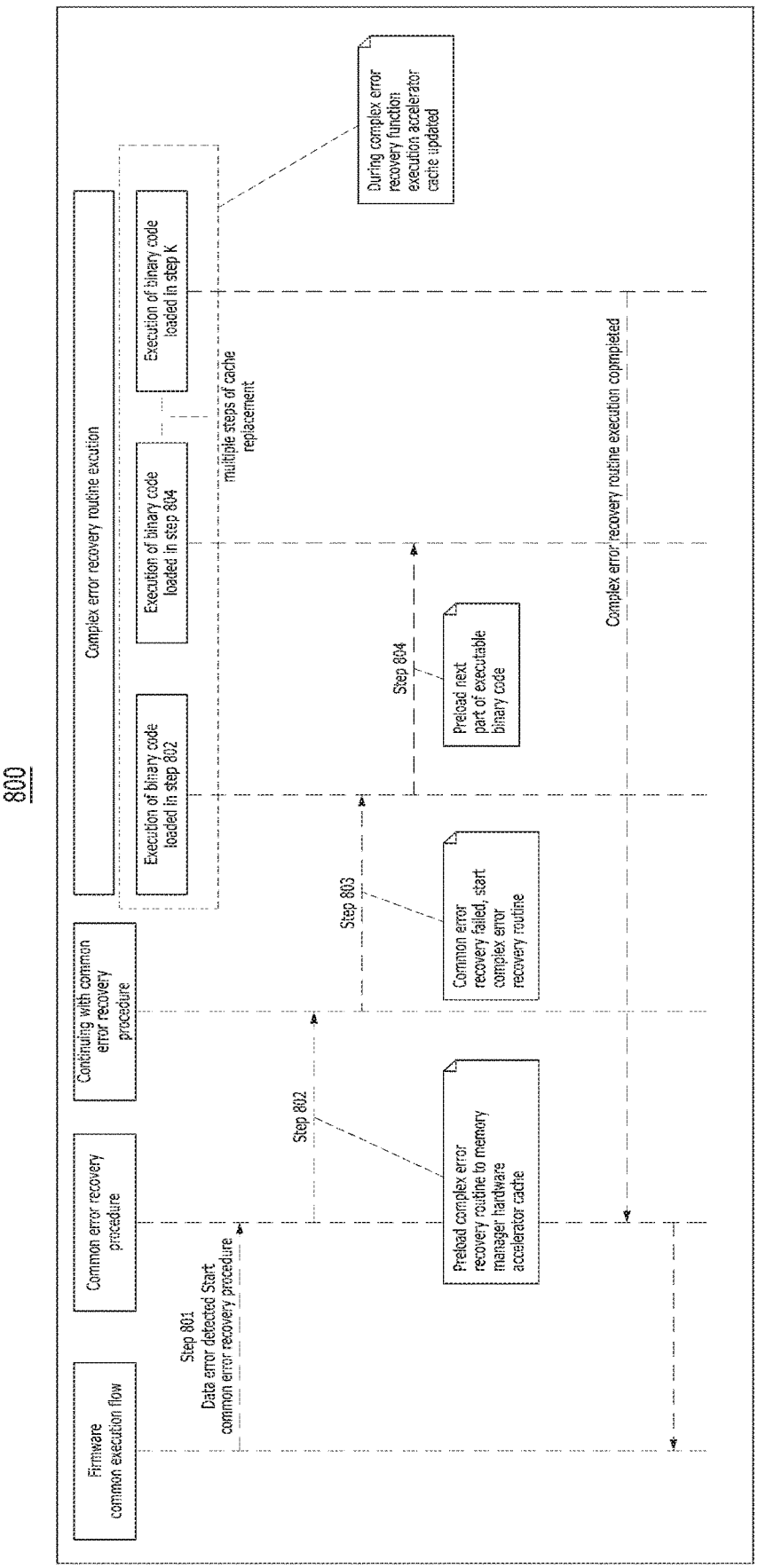
FIG. 8 is a flow diagram illustrating firmware code execution flow in accordance with an embodiment of the present invention.

FIG. 8 shows exemplary firmware code execution flow and operation of the accelerator 401. Those skilled in the art will understand that additional and/or alternative steps may be performed to effectuate aspects of the present invention without departing from the inventive concepts disclosed herein. The flow diagram 800 of FIG. 8 is described with secondary reference to FIGS. 4-7.

By way of example, assume that at some point at least a part of SRAM 704 that is used to store complex error recovery function code is to be released to be used for other system tasks. Before so releasing such part of SRAM 704, the accelerator 401 is reconfigured to redirect invocations of the complex error recovery functions to DDR 702A. Thus, this demonstrates the dynamic firmware executable code remap feature of the accelerator 401.

Referring to the flow diagram 800 of FIG. 8, as firmware is being executed, in step 801 a data error is detected, which triggers the start of a common error recovery procedure. As such procedure is being performed, a complex error recovery routine along with initial binary code are preloaded into the cache 604 of the memory manager hardware accelerator 401 in step 802. The common error recovery procedure continues but eventually fails; at this time the complex error recovery routine is started (step 803). The first part of the complex error recovery procedure binary code preloaded in step 802 is executed, and while such execution is occurring, in step 804 next required binary code of the complex error recovery procedure is loaded into the cache 604 and executed. In such system, the CPU 402 executes already prefetched executable binary code instead of accessing in real time underlying physical memory to fetch binary executable code. This iterative process of loading new binary code into the cache 604 as the previous version of binary code is executed and then executing the newly uploaded (updated) binary code may continue for any suitable number of, e.g., k, times up to a last time (step k). Thus, during execution of the complex error recovery function, the cache 604 of the memory manager hardware accelerator 401 is updated multiple times.

As demonstrated above, aspects of the present invention provide various advantages including a memory manager hardware accelerator to reduce CPU access time to executable binary code stored in different system memories. Such accelerator, which includes a cache, advantageously predicts which part of the firmware binary image is to be executed in the next step, preloads, from memory regions, the corresponding part of the firmware binary image to the cache, and executes the corresponding part of the firmware image preloaded in the cache.

Although the foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive.

What is claimed is:

1. A memory manager hardware accelerator, comprising:
    a controller and command processor (CCP) module configured to control data flow and to determine which internal commands are to be executed;
    a processor instructions analyzer operably coupled to a processor and to the CCP module, the processor instructions analyzer being configured to search for processor specific branch instructions, among instructions committed to the processor and among binary executable code preloaded to an accelerator cache, and to generate a transaction to notify the CCP module when the specific branch instructions are detected;
    a cache manager configured to hold data and notify the CCP module as to whether data required by the CCP module is present in the cache manager; and
    a direct memory access (DMA) engine configured to transfer data from a target address to the cache manager under the control of the CCP module.

2. The memory manager hardware accelerator of claim 1, wherein the processor instruction analyzer supports detection of specific internal commands including at least one of preload data, preload data without cache update, invalidate selected cache, invalidate all cache, update virtual to physical mapping table entry, and DMA transfer.

3. The memory manager hardware accelerator of claim 2, wherein a virtual to physical address translation table includes virtual start addresses, respective virtual end addresses, respective physical start addresses, an executable region flag.

4. The memory manager hardware accelerator of claim 1, wherein the CCP module stores a translation of virtual addresses to respective physical addresses.

5. The memory manager hardware accelerator of claim 4, wherein the CCP module initiates data transfer by the DMA engine from a source memory location to the cache manager.

6. A memory system, comprising:
    a tightly-coupled memory (TCM) configured to store a first of N parts of a firmware binary image;
    multiple memory regions configured to store a second to Nth part of the firmware binary image respectively, each of the memory regions being operably coupled to a bus;
    a processor operably coupled to the TCM and configured to execute the parts of the firmware binary image; and
    a memory manager hardware accelerator operably coupled between the processor and the bus and configured to predict which part of the firmware image is to be executed next, while the processor executes a different part of the firmware image.

7. The memory system of claim 6, wherein firmware source code is compiled for a single virtual memory map view independently of locations of the N parts of the firmware image.

8. The memory system of claim 7, wherein the memory manager hardware accelerator is configured to convert virtual addresses to corresponding physical addresses, which configuration is dynamically changeable.

9. The memory system of claim 6, wherein the memory manager hardware accelerator is configured to analyze data including executable binary code and searches for branch instructions.

10. A method of operating a memory manager hardware accelerator in a memory system, the method comprising:
    detecting a data error in the memory system;
    initiating a first error recovery process;
    preloading a second error recovery process including associated initial code in the memory manager hardware accelerator, while performing the first error recovery process;
    executing the initial code for the second error recovery process when the first error recovery process fails;
    loading next part of the code for the second error recovery process during execution of the initial code in the second error recovery process; and
    executing the next part of he code for the second error recovery process.

11. The method of claim 10, wherein the first error recovery process is a common error recovery process and the second error recovery process is a complex error recovery process.

* * * * *